United States Patent
Cheung et al.

(10) Patent No.: US 11,012,898 B2
(45) Date of Patent: May 18, 2021

(54) USE OF A NETWORK TO COMMISSION A SECOND NETWORK

(71) Applicant: Silicon Laboratories Inc., Austin, TX (US)

(72) Inventors: Wing Ming Cheung, Hong Kong (CN); DeWitt Clinton Seward, IV, Arlington, MA (US); Gregory Allan Hodgson, Austin, TX (US); Rasmus Christian Larsen, Oslo (NO); Bernt Georg Breivik, Oslo (NO)

(73) Assignee: Silicon Laboratories, Inc., Austin, TX (US)

( * ) Notice: Subject to any disclaimer, the term of this patent is extended or adjusted under 35 U.S.C. 154(b) by 69 days.

(21) Appl. No.: 15/313,014

(22) PCT Filed: Oct. 27, 2016

(86) PCT No.: PCT/CN2016/103589
§ 371 (c)(1),
(2) Date: Nov. 21, 2016

(87) PCT Pub. No.: WO2018/076240
PCT Pub. Date: May 3, 2018

(65) Prior Publication Data
US 2018/0199246 A1 Jul. 12, 2018

(51) Int. Cl.
*H04W 36/00* (2009.01)
*H04L 29/08* (2006.01)
(Continued)

(52) U.S. Cl.
CPC ....... *H04W 36/0038* (2013.01); *H04L 67/141* (2013.01); *H04L 67/34* (2013.01);
(Continued)

(58) Field of Classification Search
CPC ........... G06F 8/61; H04W 4/003; H04W 4/80; H04W 12/04; H04W 12/50;
(Continued)

(56) References Cited

U.S. PATENT DOCUMENTS 6,298,069 B1 10/2001 Prabhu et al.
9,054,961 B1 * 6/2015 Kim ...................... H04L 67/141
(Continued)

FOREIGN PATENT DOCUMENTS

CN    101690125 A    3/2010
CN    105338524 A    2/2016
(Continued)

OTHER PUBLICATIONS

International Search Report and Written Opinion dated May 27, 2017 in corresponding PCT application No. PCT/CN2016/103589.
(Continued)

*Primary Examiner* — Melanie Jagannathan
(74) *Attorney, Agent, or Firm* — Nields, Lemack & Frame, LLC

(57) ABSTRACT

A system and method of allowing a new device to join an existing network are disclosed. A configuration tool is used to communicate relevant information from the new network device to the gateway in the existing network using a secondary network protocol different from that used by the primary network. For example, in one embodiment, messages are exchanged between the configuration tool and the new device and between the configuration tool and the gateway using BLUETOOTH®. Once all of the pertinent information has been exchanged, the new device is able to securely join the primary network, which may be based on the IEEE802.15.4 standard.

17 Claims, 4 Drawing Sheets

(51) Int. Cl.

| | | |
|---|---|---|
| *H04L 29/06* | (2006.01) | |
| *H04W 12/50* | (2021.01) | |
| *H04W 12/04* | (2021.01) | |
| *H04W 12/08* | (2021.01) | |
| *H04W 12/71* | (2021.01) | |
| *H04W 4/80* | (2018.01) | |
| *H04W 8/24* | (2009.01) | |
| *H04W 88/16* | (2009.01) | |

(52) U.S. Cl.
CPC .............. *H04L 69/14* (2013.01); *H04L 69/18* (2013.01); *H04W 12/04* (2013.01); *H04W 12/50* (2021.01); *H04W 36/0022* (2013.01); *H04L 63/101* (2013.01); *H04L 2463/062* (2013.01); *H04W 4/80* (2018.02); *H04W 8/24* (2013.01); *H04W 12/08* (2013.01); *H04W 12/71* (2021.01); *H04W 88/16* (2013.01)

(58) Field of Classification Search
CPC .......... H04W 36/0022; H04W 36/0038; H04L 12/282; H04L 41/0833; H04L 12/2803; H04L 29/06163; H04L 29/08558; H04L 63/0281; H04L 63/0884; H04L 67/34; H04L 67/141; H04L 69/14; H04L 69/18; H04B 2203/5458
See application file for complete search history.

(56) References Cited

U.S. PATENT DOCUMENTS

| | | | | |
|---|---|---|---|---|
| 9,220,012 | B1* | 12/2015 | Inamdar | H04L 63/0457 |
| 10,182,329 | B1* | 1/2019 | Roths | H04W 4/70 |
| 2008/0177998 | A1* | 7/2008 | Apsangi | H04L 63/0428 |
| | | | | 713/155 |
| 2008/0320190 | A1 | 12/2008 | Lydon et al. | |
| 2011/0137436 | A1* | 6/2011 | Chang | H04L 12/2834 |
| | | | | 700/90 |
| 2012/0014363 | A1 | 1/2012 | Hassan et al. | |
| 2012/0124367 | A1* | 5/2012 | Ota | H04W 12/04 |
| | | | | 713/153 |
| 2013/0149966 | A1* | 6/2013 | Lee | H04W 12/08 |
| | | | | 455/41.2 |
| 2014/0099887 | A1* | 4/2014 | Flanagan | H04W 4/80 |
| | | | | 455/41.1 |
| 2014/0266669 | A1* | 9/2014 | Fadell | G05B 19/042 |
| | | | | 340/501 |
| 2015/0188949 | A1* | 7/2015 | Mahaffey | H04L 63/20 |
| | | | | 726/1 |
| 2015/0229475 | A1 | 8/2015 | Benoit et al. | |
| 2015/0249605 | A1* | 9/2015 | Erickson | H04W 76/10 |
| | | | | 370/254 |
| 2015/0347114 | A1* | 12/2015 | Yoon | H04L 12/2832 |
| | | | | 235/375 |
| 2016/0081127 | A1* | 3/2016 | Lee | H04W 12/50 |
| | | | | 709/228 |
| 2016/0205553 | A1 | 7/2016 | Lee | |
| 2017/0041083 | A1* | 2/2017 | Kwon | H04B 11/00 |
| 2017/0064045 | A1* | 3/2017 | Pai | H04W 4/70 |
| 2017/0134182 | A1* | 5/2017 | Davis | H04W 4/70 |
| 2017/0156076 | A1* | 6/2017 | Eom | H04W 4/70 |
| 2017/0329596 | A1* | 11/2017 | Butler | G06F 8/65 |
| 2019/0159031 | A1* | 5/2019 | Haswell | H04L 63/0876 |
| 2019/0223014 | A1* | 7/2019 | Deshpande | H04W 4/80 |

FOREIGN PATENT DOCUMENTS

| | | | |
|---|---|---|---|
| CN | 105915416 A | 8/2016 | |
| KR | WO2015163677 A1 * | 10/2015 | ............. H04B 11/00 |
| WO | 2005/119964 A1 | 12/2005 | |
| WO | 2015/150735 A1 | 10/2015 | |
| WO | 2016/049895 A1 | 4/2016 | |

OTHER PUBLICATIONS

German communication, with English translation, dated Dec. 18, 2018 in corresponding German patent application No. 112016002340.5.

* cited by examiner

USE OF A NETWORK TO COMMISSION A SECOND NETWORK

This application is a 371 of PCT International Application No. PCT/CN2016/103589 filed Oct. 27, 2016, the disclosure of which is incorporated herein by reference in its entirety.

This disclosure describes systems and methods allowing the use of a secondary network to commission a primary network.

BACKGROUND

The explosion of network connected devices has led to an increased use of certain protocols. For example, protocols based on IEEE802.15.4, such as ZIGBEE®, are now commonly used in many applications, including utility meters, lighting systems and the like. As the use of ZIGBEE® expands, many are attempting to address some perceived security weaknesses inherent in the protocol.

One such security weakness is the process by which a new device joins an existing ZIGBEE® network. Once a device is part of the ZIGBEE® network, its packets will be encrypted using a network key. However, relaying that network key to the new device may be problematic. Many existing networks use one of two schemes to allow new devices to join.

The first scheme is to encrypt the network key using a well known security key, such as the default ZIGBEE® link key. However, this default key is well known. Thus, hackers or other malicious users can easily intercept the network key by observing traffic as a new device joins the network, thus allowing them to decrypt all traffic occurring over a ZIGBEE® network that uses the default key.

The second scheme is to encrypt the network key using a device-specific key. Unfortunately, this device-specific key must be communicated to the ZIGBEE® gateway. Currently, this is done by providing an indication of the key at the device. For example, a slip of paper with the device-specific key may be placed in the shipping box with the device. The user must then locate this indication and program that device key into the ZIGBEE® gateway. The possibility of losing this key is high, and the process may require a level of expertise that does not exist at all deployment sites.

Therefore, an improved system and method of allowing a new device to securely join a network, such as a ZIGBEE® network is needed. Further, it would be beneficial if this system and method was simple to implement so as to be easily accomplished.

SUMMARY

A system and method of allowing a new device to join an existing network are disclosed. A configuration tool is used to communicate relevant information from the new network device to the gateway in the existing network using a secondary network protocol different from that used by the primary network. For example, in one embodiment, messages are exchanged between the configuration tool and the new device and between the configuration tool and the gateway using BLUETOOTH®. Once all of the pertinent information has been exchanged, the new device is able to securely join the primary network, which may be based on the IEEE802.15.4 standard.

In one embodiment, a method of allowing a network device to securely join a network is disclosed. The method comprises establishing a network connection between the network device and a configuration tool, using a first network protocol different from a network protocol of the network; establishing a second network connection between a gateway and the configuration tool, using a second network protocol different from the network protocol of the network; using the configuration tool to obtain information from the network device and pass the information to the gateway; sending a request to join the network from the network device to the gateway using the network protocol of the network; and transmitting a network key from the gateway to the network device using the network protocol of the network in response to the request, where the network key is encrypted based on the information obtained from the network device. In certain embodiments, the information is an installation code. In certain embodiments, the method further comprises using the configuration tool to obtain network information from the gateway and pass the network information to the network device, prior to sending the request. The network information may comprise a channel and a PAN ID.

According to another embodiment, a configuration tool is disclosed. The configuration tool allows a network device to securely join a network. This configuration tool comprises a first network interface; a second network interface; a processing unit; and a memory device, comprising instructions, which when executed by the processing unit, allow the configuration tool initiate a joining process and to: establish a first network connection, via the first network interface, between the network device and the configuration tool, using a first network protocol different from a network protocol of the network; establish a second network connection, via the second network interface, between a gateway and the configuration tool, using a second network protocol different from the network protocol of the network; obtain information from the network device via the first network connection; and pass the information to the gateway via the second network connection. In certain embodiments, the first and second network protocols are BLUE TOOTH®.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
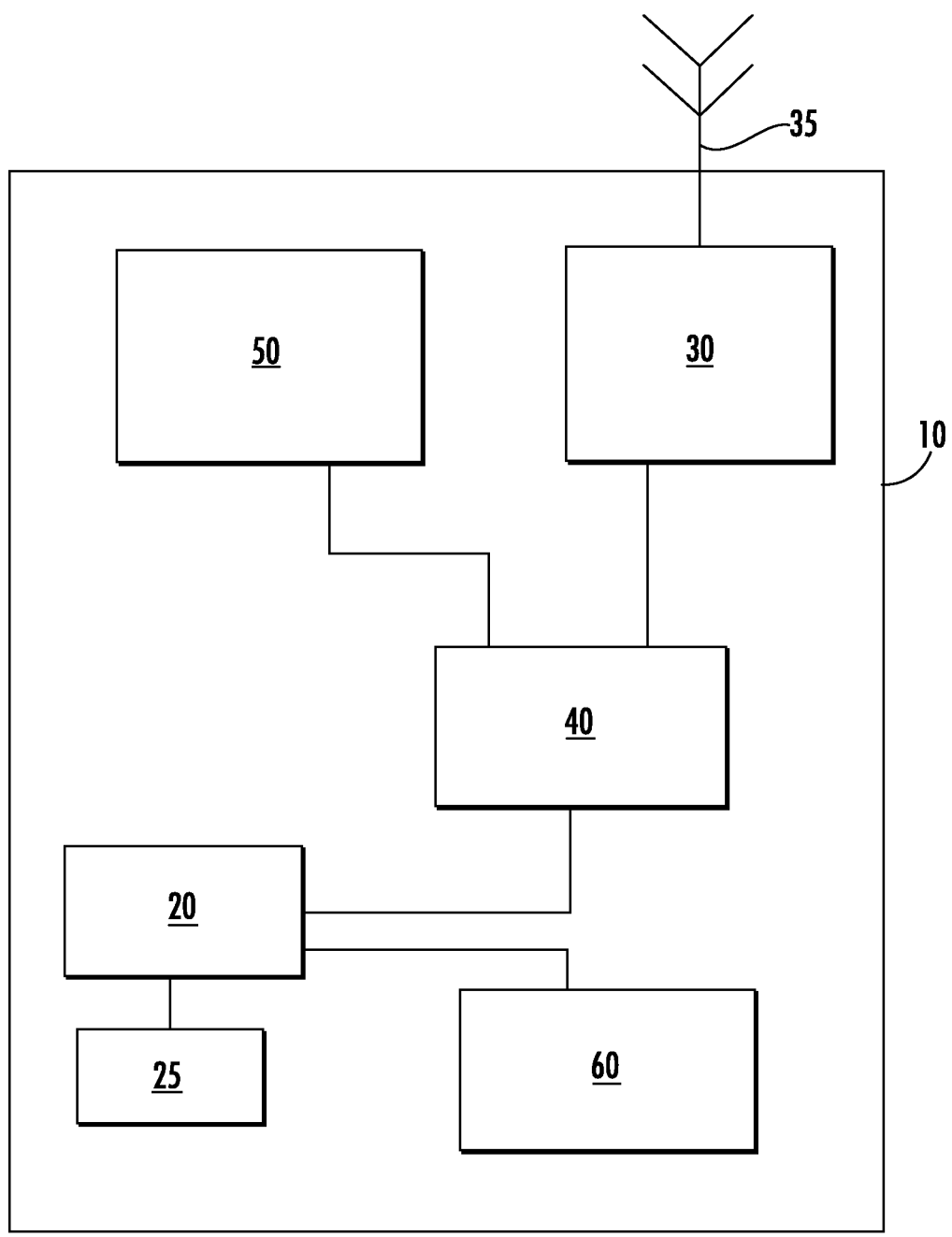
FIG. 1 is a block diagram of the configuration tool.

FIG. 1 shows a block diagram of a representative configuration tool 10. The configuration tool 10 has a processing unit 20 and an associated memory device 25. This memory device 25 contains the instructions, which, when executed by the processing unit 20, enable the configuration tool 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. In certain embodiments, the memory device 25 may be packaged with the processing unit 20. The processing unit 20 may be any suitable device, including but not limited to a general purpose processor, an application specific processor, an embedded controller, or a personal computer (PC).

The configuration tool 10 also includes a first network interface 30, which is typically a wireless interface including an antenna 35. The first network interface 30 may support any wireless network, including BLUETOOTH® or a cellular protocol, such as 3G, GCM, CDMA, 4G, LTE, or other protocols. In certain embodiments, the configuration tool 10 may include a second network interface 50, different from the first network interface 30. This second network interface 50 may support any wireless network, including BLUETOOTH® or a cellular protocol, such as 3G, GCM, CDMA, 4G, LTE, or other protocols.

The configuration tool 10 may include a second memory device 40 in which data that is received by the first network interface 30, and data that is to be transmitted by the first network interface 30, is stored. Additionally, data sent and received by the second network interface 50 may be stored in the second memory device 40. This second memory device 40 is traditionally a volatile memory. The processing unit 20 has the ability to read and write the second memory device 40 so as to communicate with the other devices in the network. Although not shown, the configuration tool 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the configuration tool 10. The instructions contained on this second computer readable media may be downloaded onto the memory device 25 to allow execution of the instructions by the configuration tool 10.

The configuration tool 10 may also include a display element 60. In some embodiments, the display element 60 may be a LED or LCD screen. In certain embodiments, the display element is a touch screen so that input may be supplied to the processing unit 20 through the display element 60. In other embodiments, the configuration tool 10 may also be in communication with a separate input device to allow user entry. The input device may be a keyboard, for example.

Any device that includes the components enumerated above may be used as the configuration tool. In one specific embodiment, the configuration tool 10 may be a mobile telephone or tablet computer. In certain embodiments, the instructions described herein may be packaged as an application. The configuration tool 10 may receive the application from a remote server. For example, in one embodiment, an application may be made available on a remote server, such as a corporate server. In certain embodiments, the application may be available on a digital distribution platform, such as Google Play, Microsoft Store, the Apple App Store and others. Of course, in other embodiments, the software may be pre-loaded onto the configuration tool 10.

Figure 2:
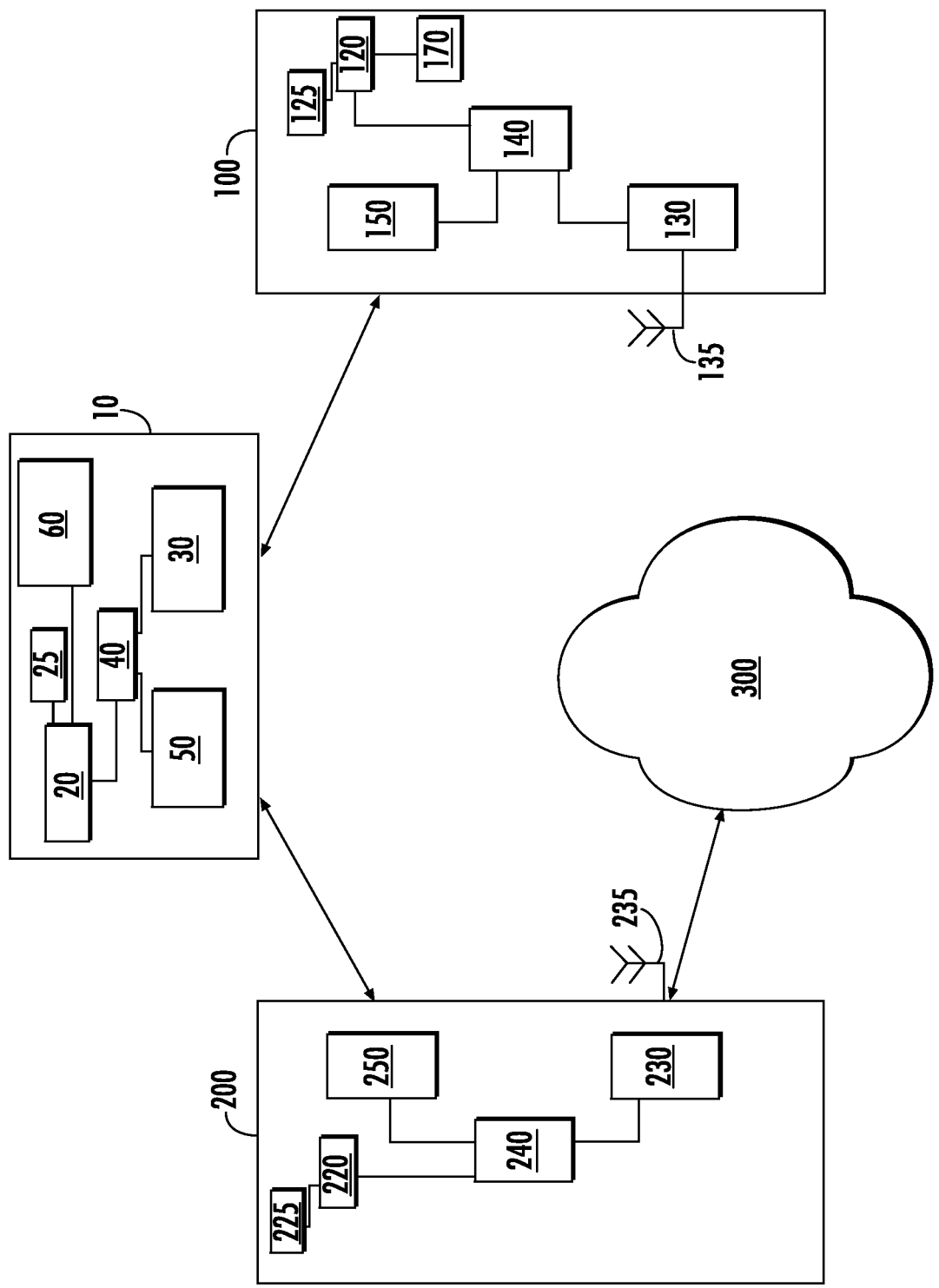
FIG. 2 shows a new device, a gateway and a configuration tool during the joining process according to one embodiment.

FIG. 2 shows the components used for the joining process according to one embodiment. In addition to the configuration tool 10, there is the new network device 100 that intends to join the existing network 300. The network device 100 has a processing unit 120 and an associated memory device 125. This memory device 125 contains the instructions, which, when executed by the processing unit 120, enable the new network device 100 to perform the functions described herein. This memory device 125 may be a non-volatile memory, such as a FLASH ROM, an electrically erasable ROM or other suitable devices. In other embodiments, the memory device 125 may be a volatile memory, such as a RAM or DRAM. In certain embodiments, the memory device 125 may be packaged with the processing unit 120. The processing unit 120 may be any suitable device, including but not limited to a general purpose processor, an application specific processor, an embedded controller, or a personal computer (PC).

The network device 100 also includes a first network interface 130, which is typically a wireless interface including an antenna 135. The first network interface 130 may support an IEEE802.15.4 protocol, such as Thread, ZIGBEE® or the like. The network device also includes a second network interface 150. This second network interface 150 supports a network protocol different from the first network interface 130. The second network interface 150 may support any wireless network, including BLUETOOTH® or a cellular protocol, such as 3G, GCM, CDMA, 4G, LTE, or other protocols. In other embodiments, the second network interface 150 may support a wired network protocol, such as USB. In certain embodiments, the new network device 100 is able to communicate on both network interfaces. In other embodiments, the network device 100 may have multiple software images, where one of these software images is used during the joining process and allows communication over the second network interface 150. Another of the software images may be used during normal operation and allows communication over the first network interface 130. These software images may be stored internally in the memory device 125, or may be stored in an external memory device 170, which may be a non-volatile memory device.

The network device 100 may include a second memory device 140 in which data that is received by the first network interface 130 and the second network interface 150, and data that is to be transmitted by the network interfaces is stored. This second memory device 140 is traditionally a volatile memory. The processing unit 120 has the ability to read and write the second memory device 140 so as to communicate with the other devices in the network. Although not shown, the network device 100 also has a power supply, which may be a battery or a connection to a permanent power source, such as a wall outlet.

FIG. 2 also shows a gateway 200. The gateway 200 is part of the network 300 to which the new network device 100 wishes to join. The gateway 200 may be any device within the network 300, but is typically the device that is responsible for controlling access to the network 300. The network 300 is typically a wireless network, such as one based on IEEE802.15.4, including but not limited to ZIGBEE®.

Like, the network device 100, the gateway 200 also includes a processing unit 220, a memory device 225, a second memory device 240, a first network interface 230, an antenna 235, and a second network interface 250. The first network interface 230 of the gateway 200 and the first network interface 130 of the new network device 100 utilize the same network protocol. The second network interfaces of the gateway 200 and new network device 100 may utilize the same network protocol, although this is not required.

In certain embodiments, the gateway 200 may include a connection to the internet. This connection may be one of the two network interfaces described above, or may be a third network interface, such as Ethernet or WiFi.

In operation, the first network interface 30 of the configuration tool 10 is able to communicate with the second network interface 150 of the new network device 100. Similarly, the second network interface 50 of the configuration tool 10 is able to communicate with the second network interface 250 of the gateway 200. In embodiments where the second network interfaces of the gateway 200 and new network device 100 utilize the same network protocol, the configuration tool 10 may communicate with both the gateway 200 and the new network device 100 using the first network interface 30. In this embodiment, the second network interface 50 of the configuration tool 10 may not be present, or may be present but be unused during the joining process.

Figure 3:
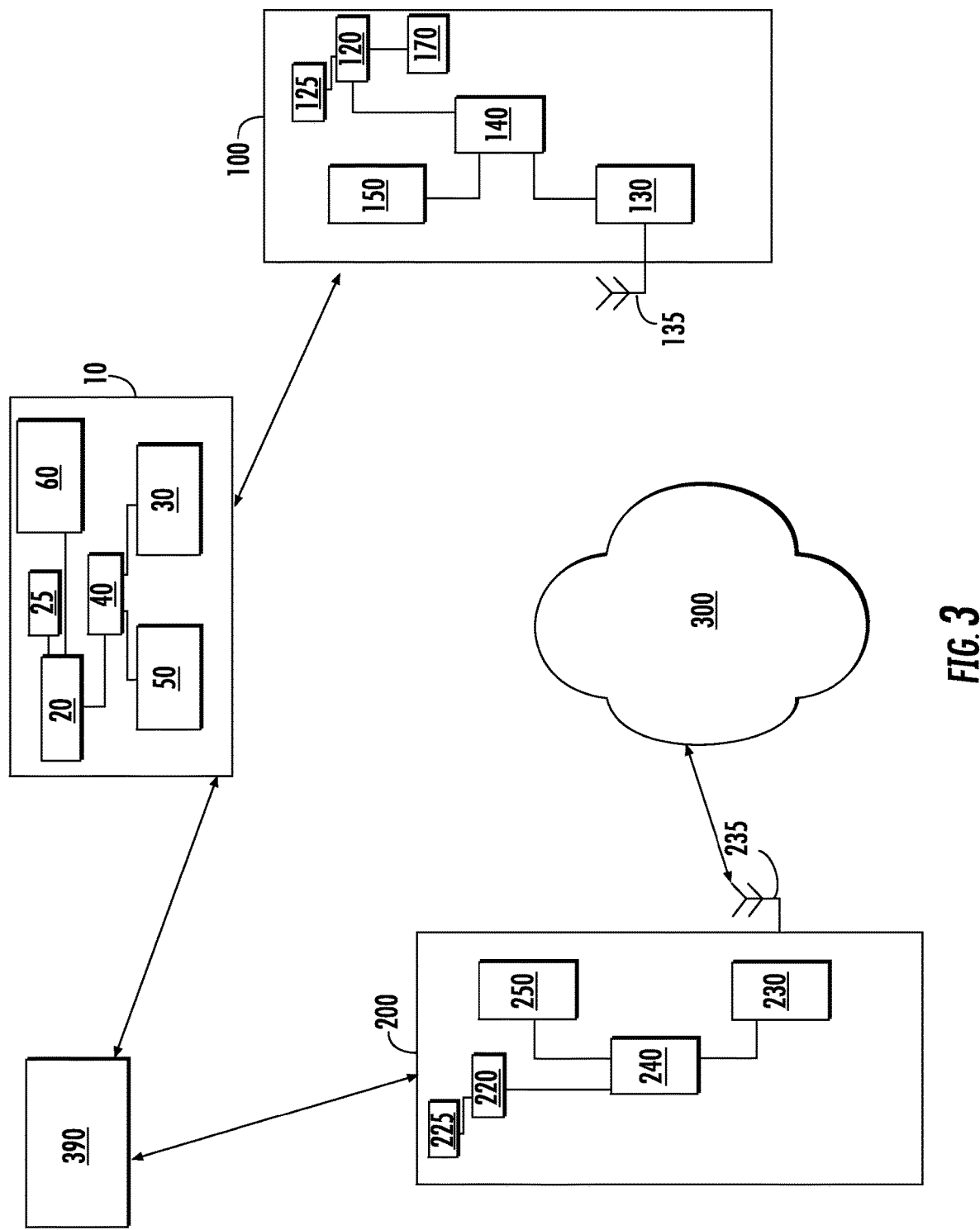
FIG. 3 shows a new device, a gateway and a configuration tool during the joining process according to a second embodiment.

FIG. 2 shows a direct connection between the second network interface 50 of the configuration tool 10 and the second network interface of the gateway 200. However, other configurations are also possible. For example, FIG. 3 shows a second embodiment. In this embodiment, the configuration tool 10 and the new network device 100 are as described above. In this embodiment, the second network interface 250 of the gateway 200 is in communication with a remote device, such as a cloud server 390. The cloud server 390 may be any server or other computer and may be able to communicate with the gateway 200 using the second network interface 250. In other embodiments, the cloud server 390 may communicate with the gateway 200 using the third network interface. In certain embodiments, this communication protocol may be any out-of-band protocol and is not limited by this disclosure. In this embodiment, the second network interface 50 of the configuration tool 10 communicates with the cloud server 390. In some embodiments, this communication may be performed using a cellular communication protocol or WIFI. The cloud server 390 then relays the information received from the configuration tool 10 to the gateway 200 via the second network interface 250.

In other words, the configuration tool 10 has the ability to communicate with the new network device 100 and the gateway 200 using a network protocol different than that used by network 300. In certain embodiments, the configuration tool 10 communicates to both the new network device 100 and the gateway 200 using the same network protocol. In certain embodiments, this network protocol may be BLUETOOTH®. In certain embodiments, the configuration tool 10 communicates to the new network device 100 and the gateway 200 using different network protocols. As described above, the communication between the configuration tool 10 and the gateway 200 may be direct (as shown in FIG. 2) or indirect (as shown in FIG. 3).

Further, the previous disclosure describes embodiments where the communication between the configuration tool 10 and the new network device 100 and gateway 200 is performed using wireless network protocols. However, other embodiments are possible. For example, the new network device 100 may include a hardware port, such as a USB port. The first network interface of the configuration tool 10 may be compatible with this hardware port such that a physical cable is used to connect the configuration tool 10 and the new network device 100. Alternatively, or additionally, the second network interface 250 of the gateway 200 may include a hardware port, such that the second network interface 50 of the configuration tool 10 connects to the gateway 200 using a physical cable.

Having described the physical configuration of these components, the method of using the configuration tool 10 to allow the new network device 100 to join network 300 will be described.

Traditionally, when a new device joins a network, it requires the network key to be able to decrypt all communications occurring on that network. This network key must be transmitted to the new network device by the gateway. However, simply sending the network key to the new network device compromises the security of the network, as the network key is unencrypted. Therefore, if a hacker is monitoring network traffic, the network key can be readily captured and used to decrypt all other traffic on the network.

As an alternative, in some embodiments, the network key is transmitted to the new network device encrypted using a link key. The link key may be a default value, or a device unique value. In the case of a default value, the security of the network is still compromised, as the default value of the link key is published and is well known. Thus, a hacker monitoring the traffic can decrypt the network key, since the link key is already known.

Consequently, the most secure approach is to create a link key that is somehow unique to a particular network device. This may be achieved by associating a unique installation code with each network device. This installation code may accompany the network device when it is delivered to the customer, such as on a piece of paper. The user must then enter this installation code into the gateway, so that the gateway can generate the link key and transmit the network key to the new network device. However, this process is manual and is flawed since the joining process relies on the customer's ability to retain the installation code for each device, and correctly enter that information into the gateway.

Figure 4:
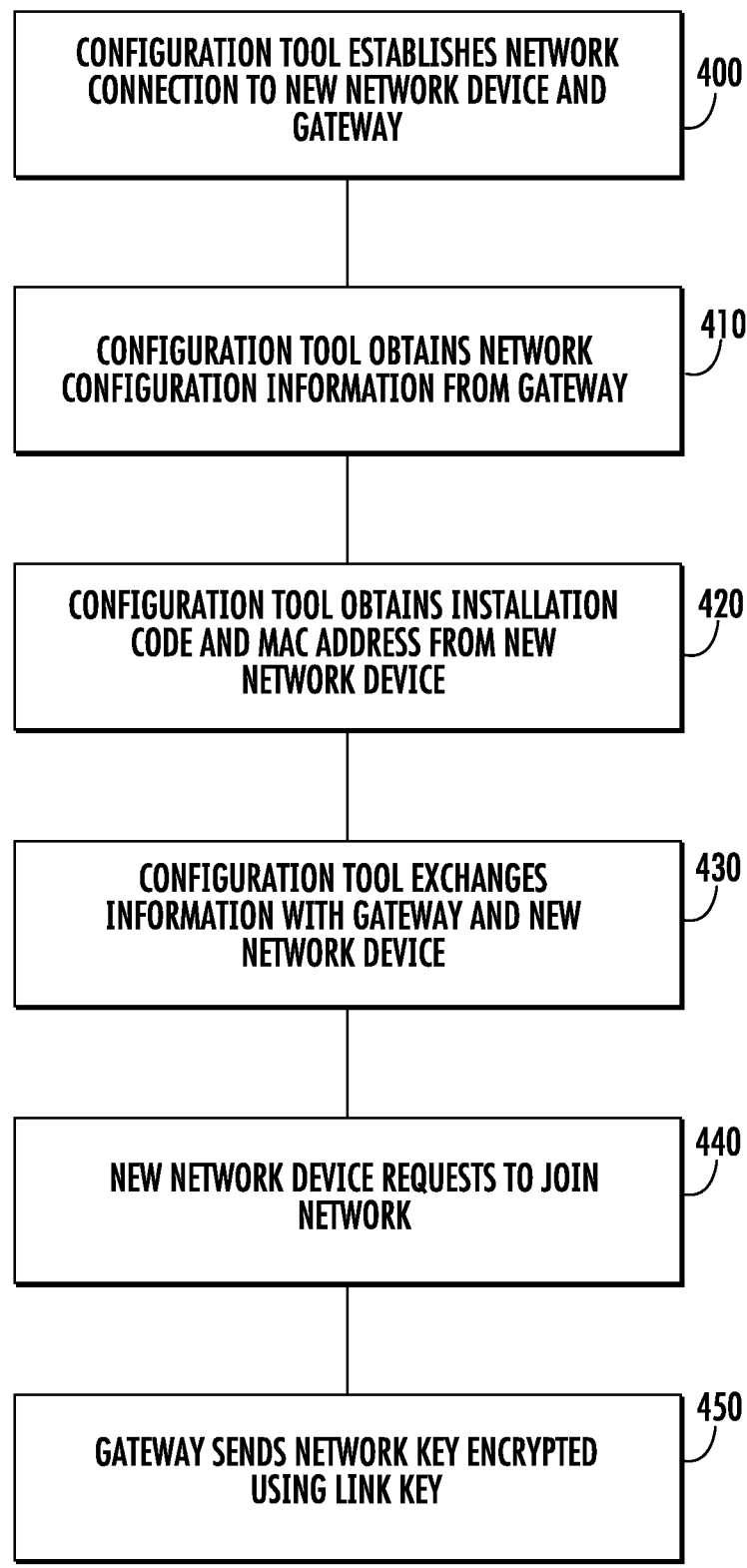
FIG. 4 shows a flowchart of the joining process.

FIG. 4 shows a flowchart illustrating the joining process according to one embodiment. In this embodiment, the configuration tool 10 establishes communication with the new network device 100 and the gateway 200, as shown in Process 400. In certain embodiments, the configuration tool 10 maintains simultaneous connections to both devices. In other embodiments, the connections between the configuration tool 10 and the new network device 100 and between the configuration tool 10 and the gateway 200 are sequential. In certain embodiments, the configuration tool 10 establishes a secure connection to one or both of the other devices. However, in other embodiments, the connections to each of the other devices may not be secure. As described above, the connection to the configuration tool 10 is performed using the second network interface of the other two components.

In certain embodiments, the configuration tool 10 may include a display element 60. This display element may be used to display the available gateways and non-connected network devices. In this way, the user may be able to select the particular gateway and network device which will participate in the sequence shown in FIG. 4.

Once the connections have been established, the configuration tool 10 optionally obtains network information from the gateway 200, such as the channel and extended PAN ID, as shown in Process 410. Of course, the configuration tool 10 may obtain additional information from the gateway 200 if desired.

The configuration tool 10 then obtains certain information from the new network device 100. This information may include the MAC address (also referred to as the IEEE address) of the new network device 100, as well as its installation code, as shown in Process 420.

The configuration tool 10 then transmits the information that it received from the gateway 200 to the new network device 100, and transmits the information that it received from the new network device 100 to the gateway 200, as shown in Process 430.

It should be noted that Processes 410 and 420 may be performed in the opposite order if desired. Additionally, the swapping of information in Process 430 may be performed as independent processes. For example, Process 410 may be performed, and this information may be transmitted to the new network device 100. Process 420 may then be performed and this information then relayed to the gateway 200. In certain embodiments, regardless of the sequence, the configuration tool 10 obtains information from the gateway 200 and the new network device 100 and transmits this information to the other component. In other embodiments, the configuration tool 10 obtains information from the new network device 100 and transmits this information to the gateway 200.

This part of the sequence (i.e. Process 400-420) replaces the use of the default link key or the need to manually enter the installation code into the gateway 200. Further, in certain embodiments, a new network device may be added in an environment where there are multiple networks. By transferring information from the gateway to the new network device 100, the new network device is informed as to which network 300 it is to join. Further, by providing the MAC address to the gateway 200, the gateway 200 is informed which device will be attempting to join its network 300. This may minimize the chances of a malicious actor joining the network 300.

Once this information has been exchanged, the traditional joining process may continue. As described above, the link key may be created using the installation code. Next, the new network device 100 asks the gateway 200 to join network 300, as shown in Process 440. Because it has already been informed of the PAN ID and channel, the new network device 100 is able to send the request to the desired network 300. In other embodiments, the new network device 100 simply sends a request without identifying the particular network. The gateway 200 then responds by sending the new network device 100 the network key. Because the gateway 200 is aware of the installation code, the gateway 200 is able to encrypt the network key using the link key, as shown in Process 450. This link key is also known to the new network device 100, as well. At this point, the new network device 100 has joined the network 300.

Thus, in one embodiment, the joining process utilizes one or more secondary network protocols, different that the primary network protocol. These secondary network protocols are used to exchange information between the gateway 200 and the new network device 100, which is facilitated by the use of a configuration tool 10, which is able to establish network connections with each of these components. In certain embodiments, the configuration tool 10 is used to retrieve information from the new network device 100 which is passed to the gateway 200.

Further, in one specific embodiment, the configuration tool 10 has a BLUETOOTH® interface, and communicates with both the new network device 100 and the gateway 200 using BLUETOOTH®. In this embodiment, the configuration tool 10 may be any device that supports BLUETOOTH®, including personal computers, tablet computers, mobile telephones and the like. The software executed on the configuration tool 10 may be downloaded to the configuration tool 10 from a remote server, or a digital distribution platform, as described above.

In other embodiments, the configuration tool may communicate with the gateway 200 and the new network device 100 using different secondary network protocols. In one embodiment, BLUETOOTH® is used to communicate with the new network device 100, while WIFI® or USB is used to communicate with the gateway 200. Of course, the secondary network protocols may be different than those described above, as this is meant to serve as an example.

In yet other embodiments, such as that shown in FIG. 3, the configuration tool 10 may communicate with a remote server, such as a cloud server 390, that has access to the gateway 200. In this embodiment, the configuration tool 10 may communicate with the new network device 100 using BLUETOOTH®, while using a cellular protocol, such as LTE, 4G, GSM, 3G or the like, to communicate with the cloud server.

While the above disclosure describes a system and mechanism to allow a new network device to join a network 300, other enhancements are also possible using this approach. For example, when the gateway 200 provides information to the configuration tool 10, that information may also include exactly which network protocol is being used by network 300. For example, ZIGBEE®, Thread and other protocols all utilize the IEEE802.15.4 standard. Thus, in one embodiment, the gateway 200 passes the network protocol information to the configuration tool 10, which then forwards this information to the new network device 100. Based on this information, the new network device 100 may select one of the software images that supports the identified network protocol. As described above, these software images may be stored in the external memory device 170 or in the memory device 125. In other words, the configuration tool 10 may indicate the network protocol which the new network device 100 is to use. This then causes the new network device 100 to load one of a plurality of software images into its memory device 125 and execute the instructions contained in this software image. This allows the user to not only allow the network device 100 to join a pre-existing network, but also allows configuration of the network device 100 at the network protocol level.

Furthermore, the configuration tool 10 may also be used for other purposes. The ability to facilitate secure joining of a network and selection of a software image have already been described. Additionally, the configuration tool 10 may also convey information to the new network device regarding its operation on the network 300. In one specific embodiment, the network 300 may include a plurality of lights, and the new network device 100 may be a switch. The configuration tool 10 may relay information to the new network device 100 regarding how to control all or a subset of these lights. For example, in one embodiment, the user may use the display element 60, such as a touchscreen, to select a particular group of devices on the network 300 that the new network device 100 is to control.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of allowing a network device to securely join a network, wherein the network utilizes a network protocol defined by IEEE802.15.4, comprising:
    establishing a network connection between the network device and a configuration tool, using a first network protocol different from a network protocol of the network;
    establishing a second network connection between a gateway and the configuration tool, using a second network protocol different from the network protocol of the network;
    using the configuration tool to obtain information from the network device using the network connection;
    passing the information from the configuration tool to the gateway using the second network connection;
    sending a request to join the network from the network device to the gateway using the network protocol of the network;
    creating, at the gateway, a link key using the information passed to the gateway by the configuration tool; and
    transmitting a network key from the gateway to the network device using the network protocol of the network in response to the request, where the network key is encrypted using the link key.

2. The method of claim 1, wherein the information comprises an installation code.

3. The method of claim 1, further comprising:
    using the configuration tool to obtain network information from the gateway and pass the network information to the network device, prior to sending the request.

4. The method of claim 3, wherein the network information comprises a channel and a PAN ID.

5. The method of claim 4, wherein the request is sent to the gateway identified by the network information.

6. The method of claim 3, wherein the network information comprises the network protocol used by the network, and wherein the network device configures itself to utilize the network protocol.

7. The method of claim 6, wherein the network device comprises a memory device containing a plurality of software images, and the network device selects one of the software images based on the network protocol.

8. The method of claim 1, wherein the first network protocol and the second network protocol are the same network protocol.

9. The method of claim 1, wherein at least one of the first network protocol and the second network protocol comprises BLUETOOTH® protocol.

10. A method of allowing a network device to securely join a network, wherein the network utilizes a network protocol defined by IEEE802.15.4, comprising:
    using a configuration tool to obtain information from the network device;
    using a second network protocol, different than the network protocol to pass the information from the configuration tool to a gateway;
    creating a link key, at the gateway, using the information; and
    transmitting a network key from the gateway to the network device over the network using the network protocol, wherein the network key is encrypted using the link key.

11. The method of claim 10, wherein the information comprises an installation code.

12. The method of claim 10, further comprising:
    passing network information from the gateway to the network device using the second network, prior to transmitting the network key, wherein the network device sends a request to join the network to the gateway identified by the network information.

13. The method of claim 12, wherein the network information comprises a channel and a PAN ID.

14. The method of claim 1, further comprising decrypting the network key at the network device using the link key.

15. The method of claim 10, further comprising decrypting the network key at the network device using the link key.

16. A gateway for allowing a network device to securely join a network, wherein the network utilizes a network protocol defined by IEEE802.15.4, comprising:
    a first network interface;
    a second network interface;
    a processing unit; and
    a memory device, comprising instructions, which when executed by the processing unit, allow the gateway to:
        establish a first network connection, via the first network interface, between the gateway and a configuration tool, using a first network protocol different from a network protocol of the network;
        obtain information about the network device via the first network connection;
        create a link key using the information; and
        transmit a network key to the network device over the network using the network protocol defined by IEEE802.15.4, wherein the network key is encrypted using the link key.

17. The gateway of claim 16, wherein the first network protocol comprises BLUETOOTH® protocol.

* * * * *